(12) United States Patent
Qian et al.

(10) Patent No.: US 8,327,195 B1
(45) Date of Patent: *Dec. 4, 2012

(54) NON-INTRUSIVE EYE MONITOR SYSTEM

(75) Inventors: Haoli Qian, Fremont, CA (US); William Lo, Cupertino, CA (US); Runsheng He, Sunnyvale, CA (US); Jeffrey Choun, San Jose, CA (US); Ping Zheng, Milpitas, CA (US); Hui Wang, Pleasanton, CA (US); Yi-Chun Chen, San Jose, CA (US); Chee Hoe Chu, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/300,354

(22) Filed: Nov. 18, 2011

Related U.S. Application Data

(63) Continuation of application No. 11/810,762, filed on Jun. 7, 2007, now Pat. No. 8,074,126.

(60) Provisional application No. 60/813,263, filed on Jun. 12, 2006, provisional application No. 60/811,998, filed on Jun. 7, 2006.

(51) Int. Cl.
*G06F 11/00* (2006.01)
*H03H 7/30* (2006.01)

(52) U.S. Cl. ........................................ 714/704; 375/232

(58) Field of Classification Search .................. 714/704; 375/232
See application file for complete search history.

(56) References Cited

U.S. PATENT DOCUMENTS

| | | | |
|---|---|---|---|
| 4,475,210 A | 10/1984 | Couch | |
| 5,742,642 A * | 4/1998 | Fertner | 375/233 |
| 5,896,391 A | 4/1999 | Solheim et al. | |
| 5,991,339 A | 11/1999 | Bazes et al. | |
| 6,002,717 A * | 12/1999 | Gaudet | 375/232 |
| 6,246,646 B1 * | 6/2001 | Abe et al. | 369/44.27 |
| 6,366,417 B1 * | 4/2002 | Mathews et al. | 360/46 |
| 6,441,981 B1 * | 8/2002 | Cloke et al. | 360/51 |
| 6,560,053 B1 | 5/2003 | Ohta | |
| 6,650,699 B1 | 11/2003 | Tiemo | |
| 6,701,466 B1 * | 3/2004 | Fiedler | 714/699 |
| 6,757,327 B1 | 6/2004 | Fiedler | |
| 7,123,846 B2 | 10/2006 | Tateyama et al. | |
| 7,184,478 B2 | 2/2007 | Popescu et al. | |
| 7,190,742 B2 | 3/2007 | Popescu et al. | |
| 7,254,345 B2 | 8/2007 | Suzaki et al. | |
| 7,301,997 B1 * | 11/2007 | Wang et al. | 375/232 |
| 7,330,508 B2 | 2/2008 | Momtaz | |
| 7,643,576 B2 | 1/2010 | Lai et al. | |
| 7,688,887 B2 | 3/2010 | Gupta et al. | |

(Continued)

OTHER PUBLICATIONS

Eye-opening Techniques for High Data Rates Does Equalization Really Work?; Agilent Technologies; Jun. 2005; 41 pages.

(Continued)

*Primary Examiner* — James C Kerveros

(57) ABSTRACT

A system including a summer, a comparator, a zero-crossing module, and a control module. The summer is configured to (i) receive a data input signal, and (ii) generate an equalized signal in response to the data input signal. The comparator is configured to generate a recovered data signal in response to the equalized signal. The zero-crossing module is configured to generate a zero-crossing signal in response to the equalized signal. The control module is configured to generate eye information in response to i) the recovered data signal and ii) the zero-crossing signal. The eye information includes characteristic data associated with the recovered data signal, and the characteristic data when plotted provides an eye diagram.

20 Claims, 12 Drawing Sheets

U.S. PATENT DOCUMENTS 7,782,932 B2 8/2010 Payne et al.
2005/0238093 A1* 10/2005 Payne et al. ................ 375/224

OTHER PUBLICATIONS

Phase Interpolator; Serial IO Interpolator Discussion; http://iram.cs.berkeley.edu/serialio/cs254/interpolator/interp.html; Sep. 21, 2006; 6 pages.
Known Pattern with Bit Clock & Marker for the SIA-3000 with GigaView Software; Wavecrest Corporation; Dec. 2003; 7 pages.
Behnam Analui et al.; A 10-Gbs/Two-Dimensional Eye-Opening Monitor in 0.13 μm Standard CMOS; IEEE Journal of Solid-State Circuits, Vo. 40, No. 12, Dec. 2005; 11 pages.
Howard Johnson, PhD; The Perfect Probe; Oct. 14, 2004; 1 page.
88SR8020 (Kopis) Serial ATA/Serial Attached SCSI/Fibre Channel Phy Test Chip; Preliminary Specifications; Doc No. MV-S103823-oo Rev. Jul. 11, 2006; 120 pages.

* cited by examiner

NON-INTRUSIVE EYE MONITOR SYSTEM

CROSS-REFERENCE TO RELATED APPLICATIONS

This present disclosure is a continuation of U.S. application Ser. No. 11/810,762, filed on Jun. 7, 2007, now U.S. Pat. No. 8,074,126, which claims priority under 35 U.S.C §119(e) to both U.S. Provisional Application No. 60/811,998, filed on Jun. 7, 2006 and U.S. Provisional Application No. 60/813,263, filed on Jun. 12, 2006.

FIELD

The present disclosure relates to evaluation systems for communication systems, and more particularly to an eye characteristic measurement and statistical evaluation system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Data communication rates are ever increasing. This is especially true with respect to serializer/deserializers (SERDES). In general, with increased communication speeds comes increased inter-symbol interference (ISI). ISI is a function of a communication channel through which a data signal passes and a swing voltage of that signal. ISI changes voltage and timing components of a transmitted signal. To cancel the introduced ISI, equalization is implemented to provide reliable and interpretable data.

Among available equalization methods, receive side adaptive equalization, such as feedforward equalization and decision feedback equalization, are typically used. Adaptive equalization does not require advanced knowledge of channel information or an additional feedback channel from the receiver to the transmitter.

The use of receive side adaptive equalization introduces difficulty in physically measuring a characteristic of an "eye" that is associated with a signal at a decision point of a circuit. When the traces of a signal are overlaid a signal pattern is generated, which may be viewed using a lab instrument, such as an oscilloscope or other eye diagram analyzer. When the data of the signal is not in the form of a simple repeating pattern, the overlay of the traces forms a shape that resembles a partially closed eye. The decision point of a circuit refers to a data recovery point of that circuit, or in other words, the point after signal conditioning and prior to data recovery. The conditioning circuitry can affect signal shape and other signal aspects, such as jitter and amplitude. The decision point is sometimes referred to as the point at which the data is digitized. The characteristics of the eye, such as the eye opening, eye width, eye amplitude, etc., are observed to evaluate the received data signal. In general, the larger the open or clear area within the eye and/or the less traces within the eye, the better the data signal.

The characteristics of the eye can be evaluated. The eye characteristics provide information regarding the quality of the signal received by a digital sampler or data recovery circuit. The eye characteristics also provide information regarding the performance of signal conditioning circuitry and the types of signals a data recovery circuit can handle.

Using a lab instrument to measure and evaluate the eye of a signal at a decision point, in high speed communication applications, is difficult and the results from which are often inaccurate. The electrical connections that are used between the lab instrument and the decision point of the circuit under test, such as the wiring, bond connections, pins, pads, etc., causes the data signal to distort significantly. Thus, for example, a measured eye opening may not be the true eye opening at the decision point. Also, eye measurements can not be made within an integrated circuit chip via a lab instrument and cables.

SUMMARY

In general, this specification describes a system and method for eye characteristic measurement. The system includes a summer, a comparator, a zero-crossing module, and a control module. The summer is configured to (i) receive a data input signal, and (ii) generate an equalized signal in response to the data input signal. The comparator is configured to generate a recovered data signal in response to the equalized signal. The zero-crossing module is configured to generate a zero-crossing signal in response to the equalized signal. The control module is configured to generate eye information in response to i) the recovered data signal and ii) the zero-crossing signal. The eye information includes characteristic data associated with the recovered data signal, and the characteristic data when plotted provides an eye diagram.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
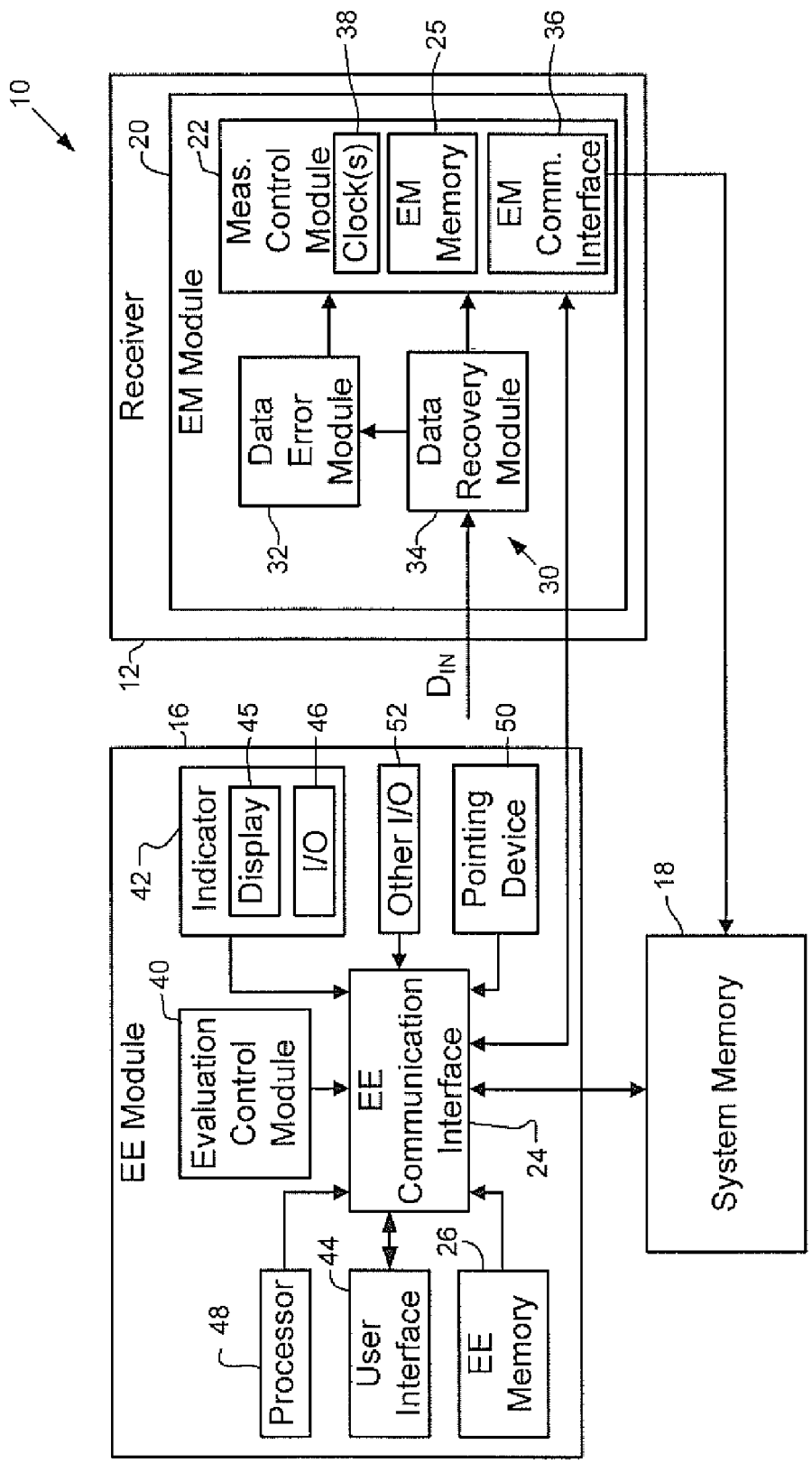
FIG. 1 is a functional block diagram of an eye monitoring system according to an embodiment of the present invention.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The below disclosed embodiments include hardware and software components that accurately measure an eye margin at a decision point. Both vertical margin (voltage margin) and horizontal margin (jitter margin) of the decision circuit may be obtained. In addition, the disclosed systems and methods described herein provide accurate statistical eye diagrams, which may be in terms of available margins in two dimensional voltage-timing plots. This information may be used to diagnosis analog circuitry with respect to timing, slew rate, noise, and clock data recovery (CDR).

Referring to FIG. 1, a functional block diagram of an eye monitoring system 10 is shown. The monitoring system 10 allows a user to evaluate the performance of a receiver 12. For example, performance evaluation may occur at or near one or more decision points of interest that are post equalization of a received data input signal (such a point is designated 14 in FIG. 2). The decision point may refer to a point downstream from a signal conditioning circuit and prior to a data sampler, digitizer, or data recovery circuit. Performance evaluation at the decision point allows for received signal evaluation taking into account packaging, substrate, and signal conditioning circuitry. Although the following embodiments are primarily described with respect to data reception performance of a front end of a receiver, the embodiments may be applied to other locations of a receiver for similar evaluation thereof.

The monitoring system 10 includes a data receiver 12, an eye evaluation (EE) module 16, and a system memory 18. The receiver 12 includes an eye measurement (EM) module 20 with an eye measurement control module 22. The measurement module 22 generates statistical eye information, which may be plotted in voltage versus time and is associated with the reception of an originally transmitted or stored signal. The information is gathered at a point prior to digital sampling or original information recovery. The EE module 16 receives the eye information via an EE communication interface 24 and indicates the eye information to a user. In an example embodiment, the eye information is indicated as a statistical eye diagram plot. Data received and generated by the BE module 16, as well as data, settings, commands, or other information entered by the user may be stored. The data and information may be stored in the EE memory 25 of the measurement module 22, in the offboard memory 18 or in the EE memory 26 of the EE module 16.

The receiver 12 represents any device, module, circuit, etc. that receives and recovers a data signal. The receiver 12 may be an integrated circuit and/or chip. The receiver 12 has one or more sampled data points that are associated with one or more received data signals of concern, such as the point 14. The reliability of the received data signals is that which is examined in evaluating the performance of the received portion 30 of the receiver 12. The receiver 12 may be referred to as a device under test. The receiver 12 may be a stand-alone device, a transceiver, or may be part of a larger communication system.

The EM module 20 also includes a data error module 32 and a data recovery module 34, in addition to the measurement module 22. The error module 32 evaluates amplitude margins and phase margins of an eye that is associated with the equalization of the input signal $D_{IN}$. The data recovery module 34 is used to recover the remotely transmitted signal (not shown), which is received in the form of the input signal $D_{IN}$. The measurement module 22 generates feedback equalization information, feedforward equalization information, statistical eye information and other information, which is provided to the error module 32, the recovery module 34, and the EE module 16. The statistical eye information may include amplitude offset information, phase offset information, bit error information, valid bit information, as well as other eye related information, which may be shared in registers of the memory 25.

In an example embodiment, the measurement module 22 is in the form of an integrated circuit and has an EM communication interface 36. As an example, the communication interface 36 may be or include one or more universal asynchronous receiver/transmitters (UARTs) that control the programming or translate the data between parallel and serial interfaces. The EM module 20 may also include one or more clocks 38, which may be incorporated into the measurement module 22, as shown.

The EE module 16 is used to evaluate the statistical data generated by the measurement module 22. As an example, the EE module 16 may be in the form of a computer or the like and have user interactive capabilities. The EE module 16 includes an evaluation control module 40, which is connected to the communication interface 24, an indicator 42 and a user interface 44. The user may initiate, provide input to, interrupt, or control the operation of the EE module 16 via the indicator 42 and the user interface 44. The user and/or the EE module 16 may also and remotely control operation of the measurement control module 22.

The evaluation module 40 is connected to the communication interface 24, receives the statistical eye information and presents the information to the user via the indicator 42. The evaluation module 40 may be in communication with, be part of or include the processor 48. The evaluation module 40 may provide a graphical user interface to gather statistics and present a statistical eye diagram to a user, examples of which are described below and shown in FIGS. 6, 7. The evaluation control module 40 may have programmable bit error rate (BER) limits and set vertical and horizontal resolutions that are associated with the eye diagram.

The indicator 42 may be a display, a monitor, a touch screen, an electronic readout, etc. As shown, the indicator 42 includes a display 45 and an input/output (I/O) device 46. The user interface 44 may be a keyboard, a touch screen, a touch pad, a scanner, a voice activated device, or other interactive communication device. The EE module 16 may further include a pointing device 50, such as a mouse, and other I/O devices 52, such as a printer or a plotter.

The communication interface 24 is used as a data transport between the receiver 12 and the EE module 16. The communication interface 24 may be unidirectional or bidirectional, or in other words, may provide signals to the EE module 16 or transport signals interactively between the receiver 12 and the EE system 16.

The evaluation module 40 and/or the communication interface 42 may control operation of the receiver 12. The control may include the transmission of one or more control signals to the receiver. The control signals may include amplitude and phase offset signals for the evaluation of points in an amplitude phase plane. Test data that is gathered by the measurement control module 22 is provided back to the evaluation module 40 for display and/or use by a system operator. The software implemented by the evaluation module 40 and/or the communication interface 42 allows a system operator to elect different plotting techniques. Portions of a statistical eye diagram may be plotted, as an example. As another example, error rate curves may be traced via algorithms within the software.

Figure 2:
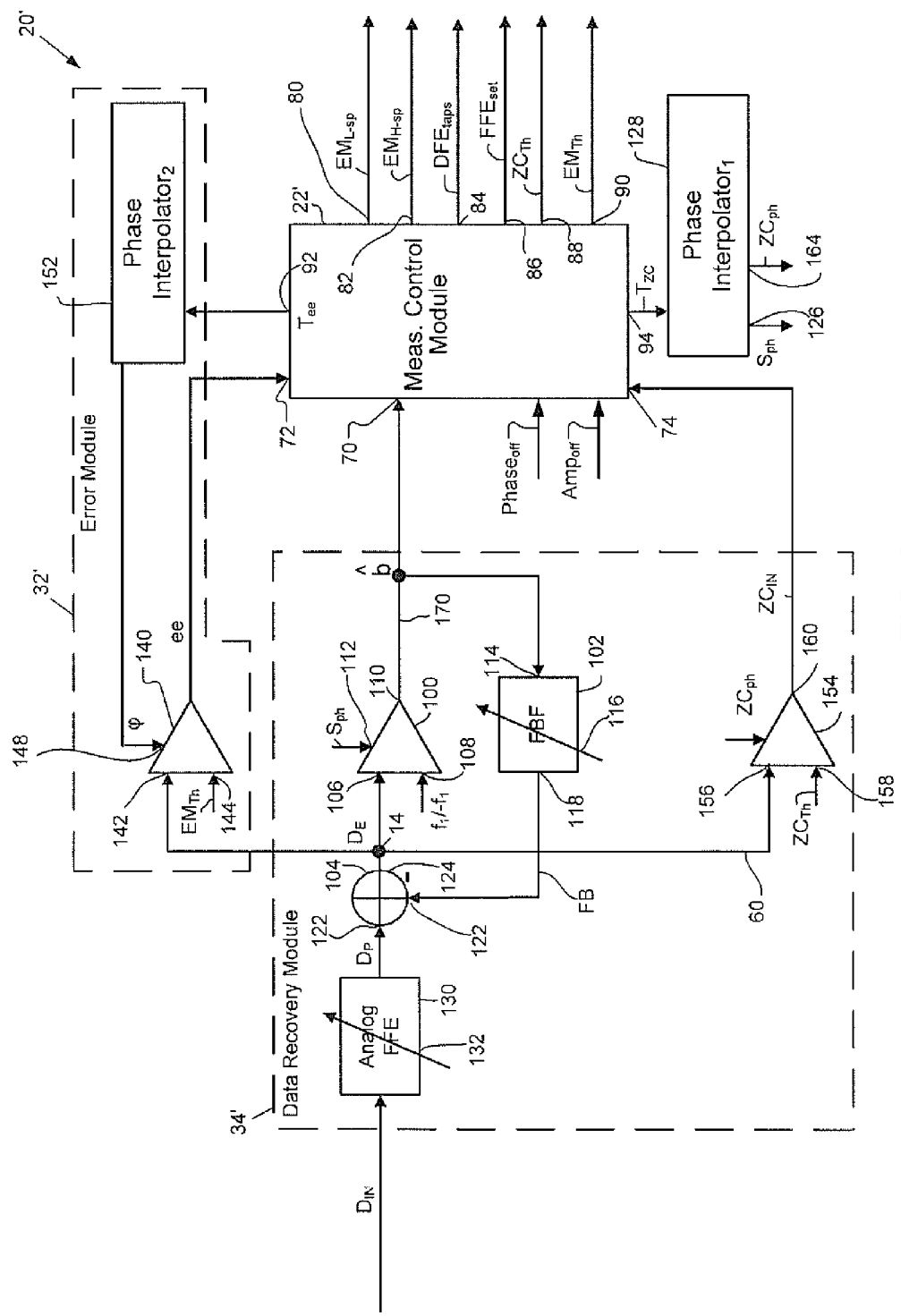
FIG. 2 is a schematic diagram of an eye monitoring module according to an embodiment of the present invention.

Referring now also to FIG. 2, in which a schematic diagram of an EM Module 20' is shown. The EM Module 20' includes a measurement control module 22', one or more data recovery loops or modules 34', one or more eye error measurement loops or modules 32', and one or more zero-crossing paths 60. The data recovery module 34' recovers an originally transmitted data signal, which is received as the data input signal D. The error measurement loop 32' generates amplitude margin and phase margin data associated with an eye. In one embodiment, multiple error measurement loops provide decision feedback equalization (DFE), feedback filter adjustment, system initialization, and/or eye measurement for external evaluation. The error measurement loops 32' may be separate from, incorporated into or information generated therefrom may be utilized by the data recovery module 34'. The zero-crossing path 60 is used to recover the transmitter clock associated with the originally transmitted signal. As will become more evident from the below description, the data recovery module 34' and the zero-crossing path 60 allow for the synchronization of the receiver clock with the clock of the originally transmitted signal.

The measurement control module 22' has multiple inputs (input ports) and outputs (output ports). The measurement control module 22' receives a phase offset signal Phase$_{off}$ and a received amplitude offset signal Amp$_{off}$ from the EE module 16. The measurement control module 22' also receives a recovered data signal b^, an eye error signal ee, and a zero-crossing information signal ZC$_{IN}$. Based on the received signals, the measurement control module 22' generates one or more statistical eye information signals EM$_{I-sp}$ and EM$_{H-sp}$, equalization control signals DFE$_{taps}$ and FFE$_{set}$, threshold or eye monitor amplitude offset signals ZC$_{Th}$ and EM$_{Th}$, and timing signals T$_{ee}$ and T$_{ZC}$ that it provides to the respective outputs. The amplitude offset signal EM$_{Th}$ is generated based on the amplitude offset signal Amp$_{off}$.

As such, the inputs of the measurement control module 22' include a data recovery input 70, an eye error input 72 and a zero-crossing input 74. The outputs of the measurement control module 22' include an eye measurement digital low-speed output 80, an eye measurement analog high-speed output 82, a DFE control module output 84, a feedforward equalization control module output 86, a zero-crossing threshold output 88, an eye error threshold output 90, an eye timing output 92, and a zero-crossing timing output 94. Note that the communication interface (not shown, but similar to the communication interface 36) of the measurement control module 22' and the corresponding communication interface of an evaluation module, such as the communication interface 24 may have corresponding digital and analog inputs and outputs associated with the outputs 80-90.

The data recovery module 34' includes a data comparator 100, a feedback filter 102 and a summer 104. The data comparator 100 digitizes an equalized data signal D$_E$ and includes a first equalized data input 106, a data threshold input 108, a data comparator output 110 and a clock sampling phase input 112. The filter 102 has a filter signal input 114, a filter control input 116 and a filter output 118. The summer 104 has a first summing input 120, a second summing input 122 and a summing output 124. The first input 106 is connected to the summing output 124.

The first input 106 is connected to the summing output 124. The data threshold input 108 is connected to the equalization control output 84. The comparator output 110 is connected to the data recovery input 70. The sampling phase input 112 is connected to a sampling phase output 126 of a first phase interpolator 128, which is in turn is connected to the timing output 94.

The filter signal input 114 is connected to the data recovery input 70. The filter control is connected to the DFE output 84. The filter output 118 is connected to the second summing input 122.

The first summing input 120 is connected to a feedforward equalization module 130, which receives the data input signal D$_{IN}$. The feedforward module 130 has a feedforward control input 132, which is connected to the feedforward control output 86.

The error module 32' includes an error comparator 140, which has a second equalized data input 142, an eye monitor threshold input 144, an error comparator output 146 and a phase offset input 148. The error comparator 140 is in a parallel configuration with the data comparator 100. The second input 142 is connected to the summer output 124. The eye monitor threshold input 144 is connected to the error threshold output 90 from which it receives the error threshold signal EM$_{Th}$. The error comparator output 146 is connected to the eye error input 72. The phase offset input 148 is connected to and receives an error phase offset signal φ from an error phase output 150 of a second phase interpolator 152, which in turn is connected to and receives the timing signal T$_{ee}$ from the eye timing output 92. The timing signal is generated based on the phase offset signal Phase$_{off}$. The error phase offset signal φ is an analog version of the timing signal T$_{ee}$.

The zero-crossing path 60 includes a zero-crossing module 154 (shown as a comparator), which has a third equalized data input 156, a zero-crossing threshold input 158, zero-crossing comparator output 160, and a zero-crossing phase input 162. The third input 156 is connected to the summing output 124. The zero-crossing threshold input 158 is connected to the zero-crossing module output 86. The zero-crossing comparator output 160 is connected to the zero-crossing module input 74. The zero-crossing phase input 162 is connected to a zero-crossing phase output 164 of the first phase interpolator 126. Note that the first phase interpolator 128 is shared by the data comparator 100 and the zero-crossing module 154.

In use the error comparator 140 may be used for either decision feedback equalization tap weight update or statistical eye measurement. During the statistical eye measurement process, the threshold signal EM$_{Th}$ and the phase signal φ may be adjusted to desired values, while the data equalization or data path 170 and the zero-crossing path 60 continue to function in normal mode. Thus, a real or actual operation environment may be tested.

Figure 3:
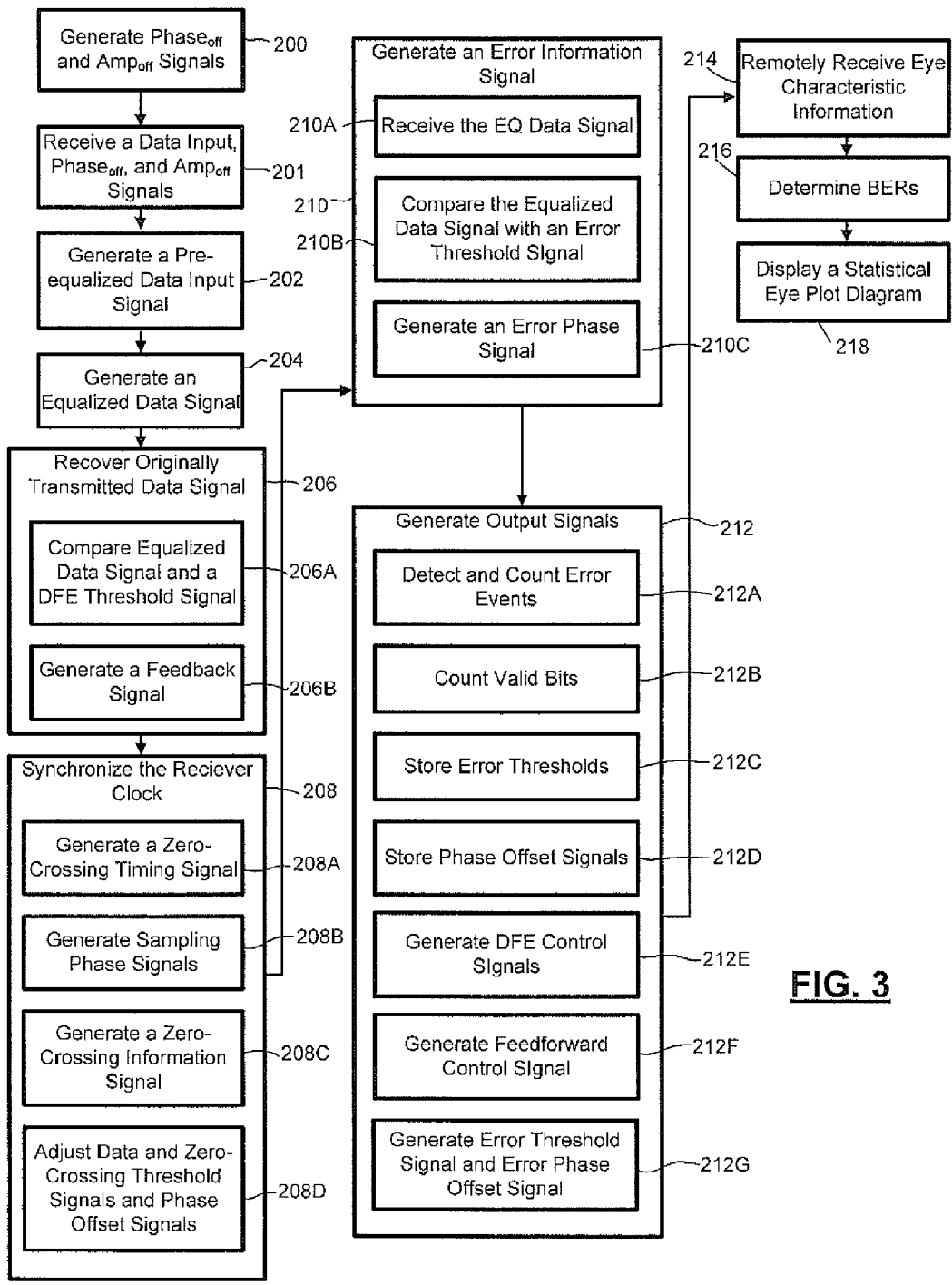
FIG. 3 is a logic flow diagram illustrating a method of operating an eye monitoring system according to an embodiment of the present invention.

Referring to FIGS. 1-3, in FIG. 3 a logic flow diagram illustrating a method of operating an eye monitoring system, such as the system 10, is shown. Although the following steps are primarily described with respect to FIGS. 1-3, they may be easily modified to accommodate other embodiments of the present invention. The following steps are iteratively performed for both equalization and eye data collection purposes. The following steps 200-212 are performed inside the receiver 12. The eye monitoring system 10 and the described method provide a statistical eye diagram, at the slicer input or decision point 14, and the total jitter contribution from the original transmitter, the channel and the receiver 12. The channel interference includes the inter-symbol interference between the transmitter and the receiver 12. Characteristic measurements are performed in steps 200-212, which are used to measure the statistics of the eye. The measurements may include eye opening, eye width, eye amplitude, eye area, and other eye measurements. The statistics may include vertical (voltage) margin, horizontal (jitter) margin and other jitter measurements. The system 10 operates in real time with the reception of incoming data, thus providing an accurate indication of the real receiver performance with the timing loop functioning and the presence of circuit noise and other real-life system operation imperfections.

In step 200, the phase offset signal Phase$_{off}$ and the amplitude offset signal Amp$_{off}$ are generated. The phase offset signal Phase$_{off}$ and the amplitude offset signal Amp$_{off}$ may be generated by the evaluation control module and/or the EE communication interface 24.

In step 201, the data input signal D$_{IN}$, the phase offset signal Phase$_{off}$ and the amplitude$_{off}$ offset signal Amp$_{off}$ are received by the EM module 20, 20'. In step 202, the data input signal D$_{IN}$ is received by the analog feedforward equalizer 130, which generates a pre-equalized data input signal D$_P$. Steps 200 and 202 may be one in the same or performed simultaneously. In step 204, a feedback signal FB, generated from the feedback filter 102, is subtracted from the pre-equalized signal D$_P$ to generate the equalized data signal D$_E$.

In step 206, the originally transmitted signal is recovered as the signal $\hat{b}$. In step 206A, the data comparator 100 compares the equalized data signal D$_E$ with an equalization threshold signal f$_1$/-f$_1$ to generate the recovered data signal $\hat{b}$ based on the sampling phase offset signal S$_{ph}$, which is generated by the first interpolator 128. The equalized threshold may be one of the DFE control signals DFE$_{taps}$, generated by the measurement control module 22, 22' and associated with the feedback filter 102, or a summed combination thereof. The DFE control signals DFE$_{taps}$ may be referred to as taps and are used to control the operating characteristics of the feedback filter 102. The DFE control signals DFE$_{taps}$ may have a designation, such as one from the series [ . . . -f$_2$, -f$_1$, f$_0$, f$_1$, f$_2$, . . . ]. In step 206B, the feedback filter 102 generates the feedback signal FB based on the recovered data signal b and one or more of the DFE control signals DFE$_{taps}$.

In step 208, the measurement control module 22, 22' recovers the transmitter clock using the CDR, which refers to the data comparator 100 and the zero-crossing module 154. The receiver clocks, such as the clocks 38, are synchronized with the transmitter clocks.

In step 208A, the measurement control module 22, 22' generates the timing signal T$_{zc}$. In step 208B, the first phase interpolator 128 generates the sampling phase signal S$_{ph}$ and the phase signal ZC$_{ph}$. In step 208C, the zero-crossing module 154 compares the equalized data signal D$_E$ with the threshold Z$_{Th}$, to generate the information signal ZC$_{IN}$. In step 208D, the threshold signals f$_1$/-f$_1$. ZC$_{Th}$, and the phase offset signals S$_{ph}$, ZC$_{ph}$ are adjusted for synchronization.

In step 210, error information associated with the eye of the equalized data signal D$_E$ is generated. In step 210A, the equalized data signal D$_E$ is received by the error comparator 140. In step 210B, the error comparator 140 compares the equalized data signal D$_E$ with the error threshold signal EM$_{Th}$ to generate the error information signal ee. The error information signal cc is generated based on the error phase offset signal φ.

In step 210C, the error phase offset signal φ is generated. The measurement control module 22, 22' generates the error timing signal T$_{ee}$. The error timing signal T$_{ee}$ may be generated via a time base generator, which multiples a reference clock to a clock with a 2T bit period. Multiple phases may be selected within that 2T period when multiple data comparators are used.

The second phase interpolator 152 generates the phase offset signal φ based on the error timing signal T$_{ee}$. The timing information generated by the measurement control module 22, 22' for the first phase interpolator 128 and the timing information generated for the second phase interpolator 152 are maintained at a predetermined fixed difference. The predetermined fixed difference corresponds to the phase offset information received from the evaluation control module 40. Thus, when the timing signal T$_{ZC}$ is adjusted, the timing signal T$_{ee}$ is also adjusted by an equal amount. This assures that the error comparator 140 samples at a phase that is in a fixed relationship with the data sampling phase S$_{ph}$, or the phase φ is equal to the sum of the sampling phase S$_{ph}$ and α, where α is a set constant. This holds true when clock data recovery (CDR) adjusts the data sampling phase S$_{ph}$ to track the clock of the receiver 12, which is synchronized with the clock of the far end transmitter. The above steps 206-210 may be performed simultaneously.

In step 212, the measurement control module generates the output signals EM$_{L-sp}$, EM$_{H-sp}$, DFE$_{taps}$, FFE$_{set}$, ZG$_{Th}$, EM$_{Th}$, T$_{ee}$ and T$_{ZC}$ based on the received data signals $\hat{b}$, ZC$_{IN}$ and ee. The eye measurement signals EM$_{L-sp}$, EM$_{H-sp}$ refer to low-speed digital eye measurement and high-speed analog eye measurement signals and may contain bit error information, valid bit information, phase offset information, and amplitude offset information.

In step 212A, the measurement control module 22, 22' compares the error information signal ee with the data recovery signal b and increments a bit error counter when an error event is generated, such as when the error information signal is different than the recovered data signal $\hat{b}$ by a predetermined amount. That is, when the decision of the error comparator 140 differs from the decision of the data comparator 100, an error is detected for that phase and voltage margin setting. The error comparator 146 operates at a specified phase offset or the phase offset φ and a specified voltage margin or the threshold EM$_{Th}$, whereas the data comparator 100 operates at the desired data comparator sampling phase S$_{ph}$, and the threshold f$_1$/-f$_1$, which have a minimum amount of data errors associated therewith. The bit error counter may refer to a value that is stored in a register of the memories 18, 25, may be a logic counter, or may be a hardware counter. The bit error counter may be located in the EM memory 25. For small BERs, such as 10$^{-18}$, averaging may be performed after polling in either the measurement control module 22, 22' or in the evaluation control module 40 when adequate counter bit numbers are not provided.

Multiple samples may be taken for a single amplitude margin and phase offset coupling. The errors for each coupling are counted. Given the population size of the test generating the errors, the coupling error total represents the BER level at the specified voltage margin and phase offset. Measurement completion for a particular margin and phase may be defined by the maximums of the bit error counter and the valid bit counter.

In step 212B, the measurement control module 22, 22' increments the valid bit counter when the data recovery signal b̂ satisfies a predetermined pattern. The valid bit counter may also refer to a register, a logic counter, or a hardware counter and be located in the EM memory 25.

In step 212C, the measurement control module 22, 22' stores the error thresholds associated with each error information signal bit comparison in a designated location, such as a register of the memories 18, 25. In step 212D, the measurement control module 22, 22' stores the phase offset signals associated with each error information signal bit comparison in another designated location, such as another register of the memories 18, 25.

In step 212E, the DFE control signals $DFE_{taps}$ are generated for adjustment of the data comparator 100 and the feedback filter 102 to improve data recovery. Various logic and software techniques may be used to generate the $DFE_{taps}$ including voting logic and eye detection logic. The DFE control signals $DFE_{taps}$ may be generated based on the information collected and stored in steps 212A-D or based on other similar information gathered from some other in-line or parallel eye error measurement module. Also, the measurement control module 22, 22' may evaluate the information gathered in steps 212A-212D to determine the quality of a signal eye diagram associated with the equalized data signal $D_E$ or to determine selective bit error rates (BERs), which may be used in the generation of the DFE control signal $DFE_{taps}$.

In step 212F, the feedforward control signal FFEset is generated to adjust the feedforward equalization for improved data recovery. The feedforward control signal FFEset may also be generated using various logic and software techniques.

In step 212G, the threshold $EM_{Th}$ and the phase φ are generated to evaluate another point of interest that has different amplitude offset and phase offset. The measurement control module 22, 22' samples at different amplitudes and phases of the associated statistical eye diagram. The measurement control module 22, 22' collects the statistics, the voltage margin for each desired BER level, at each sampling phase. The iterative adjustment of the amplitude offset threshold and the phase offset threshold allows for the voltage or amplitude margins associated with each phase to be determined for eye characteristic determination and evaluation. The threshold $EM_{Th}$ and phase φ are adjusted to desired values, while the data path and zero-crossing path continue to function in normal mode.

The following steps 214-218 may be performed inside the EE module 16. In step 214, the evaluation control module 40 acquires and/or receives the eye signals $EM_{L-sp}$, $E_{H-sp}$ or similarly stored information from one of the memories 18, 25.

In step 216, the evaluation control module 40 interprets the collected information, such as the bit error information (or error counter), the valid bit information (valid counter), the amplitude offset information and the phase offset information, to determine the BERs of each point of a statistical eye diagram. As an example of BER determination, the error counter value divided by the valid counter value is equal to the corresponding BER for a particular amplitude margin and phase offset. The matrix of the stated information and BERs may be stored in the memory 26 and/or the memory 18, as opposed to in the measurement control module 22.

Figure 4:
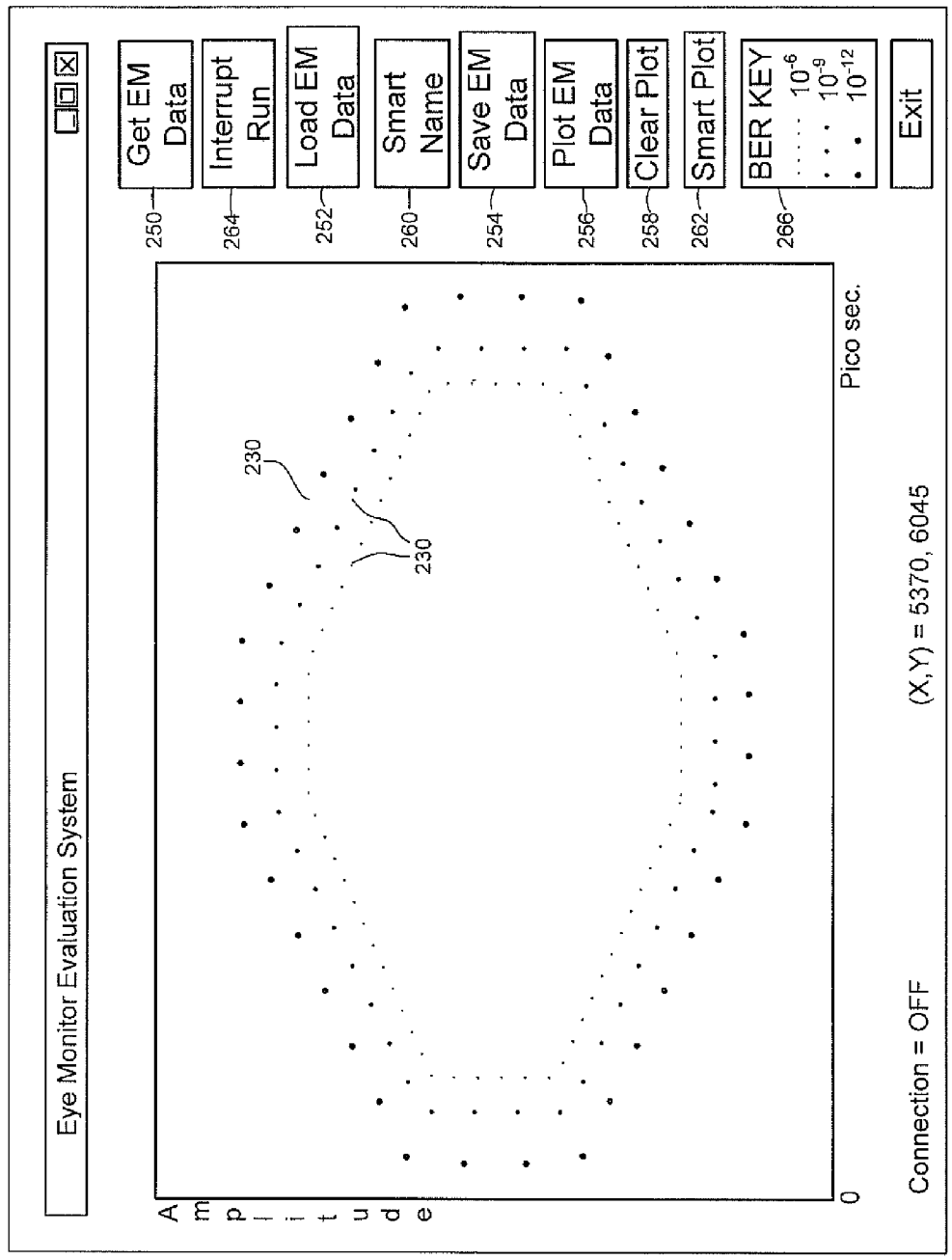
FIG. 4 is a sample graphical user interface illustrating a statistical plotted eye diagram according to an embodiment of the present invention.
Figure 5:
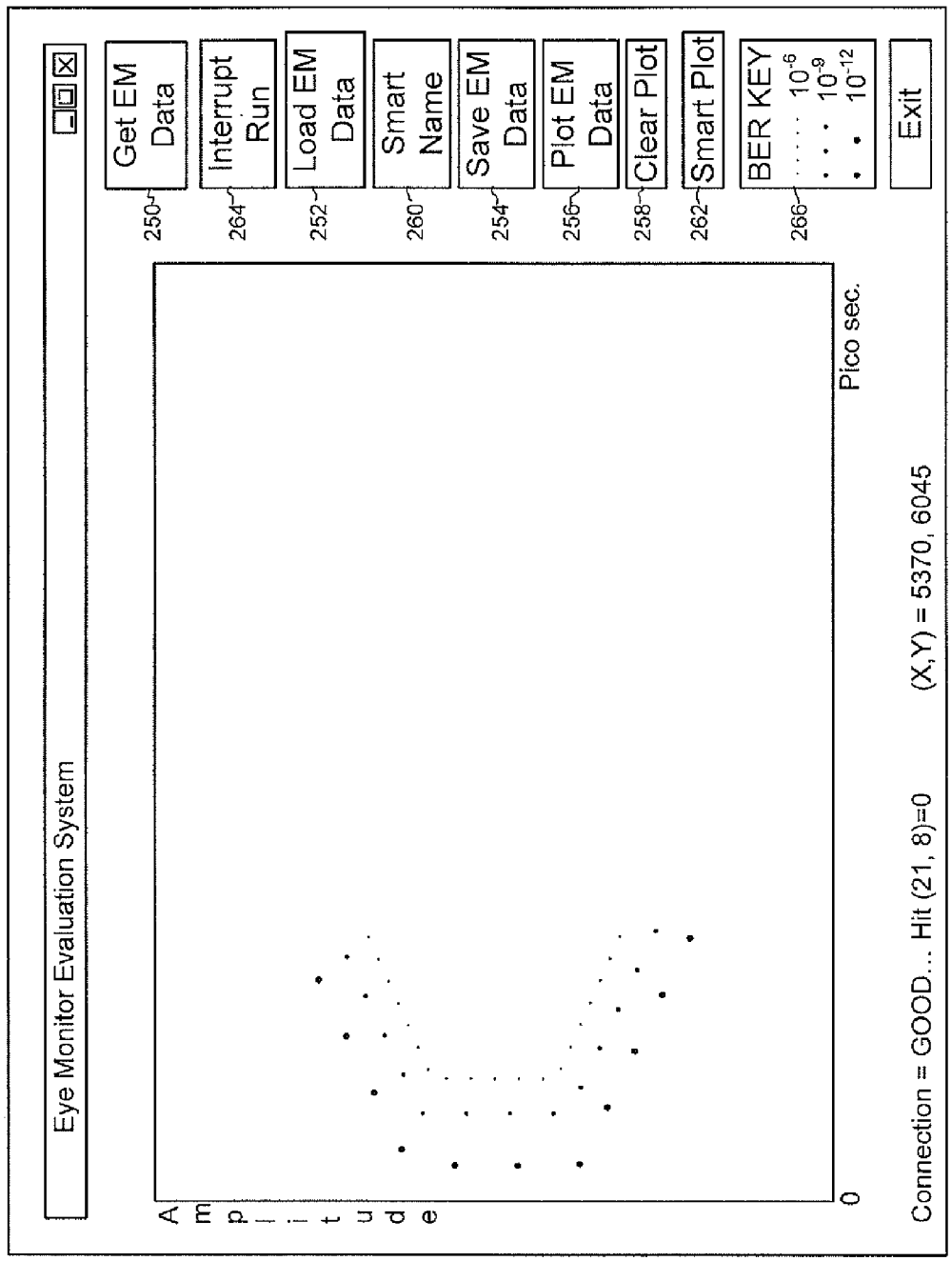
FIG. 5 is a sample graphical user interface illustrating a partial statistical plotted eye diagram during the acquiring of statistical eye data.
Figure 6:
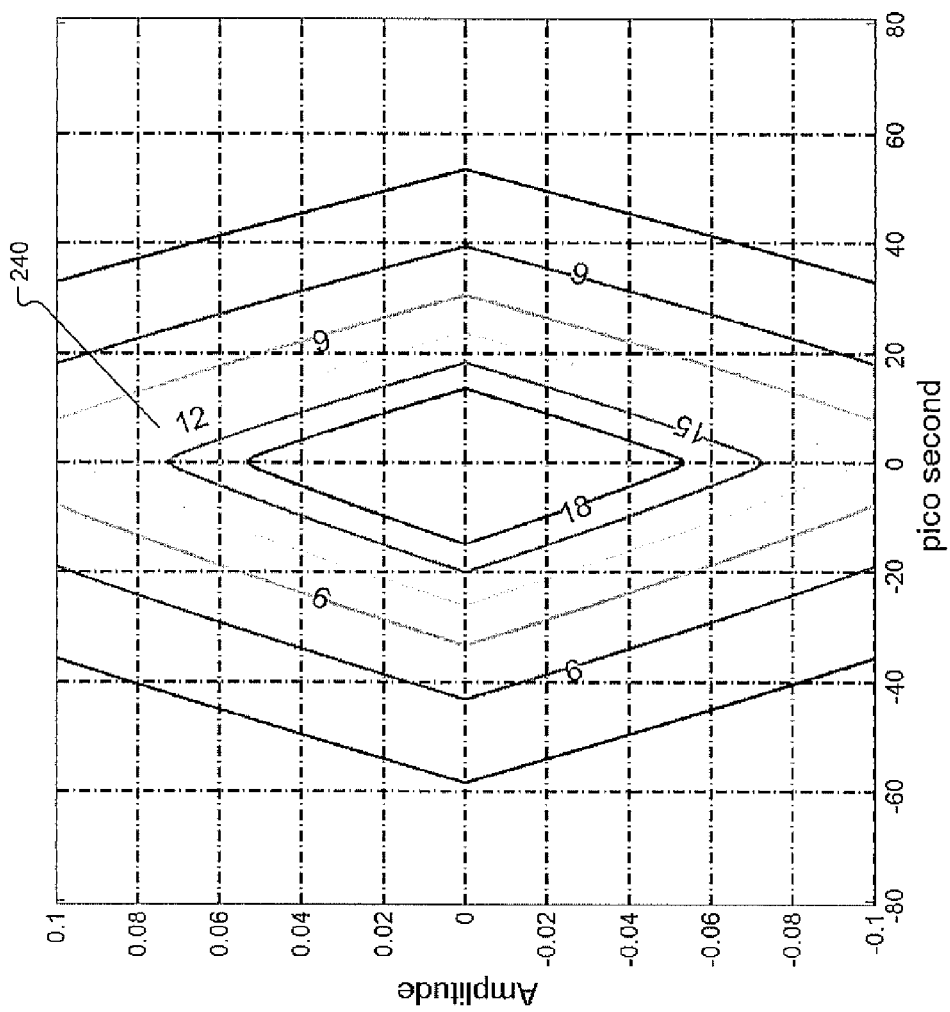
FIG. 6 is a sample statistical eye diagram generated by the eye monitoring system of FIG. 1.
Figure 7:
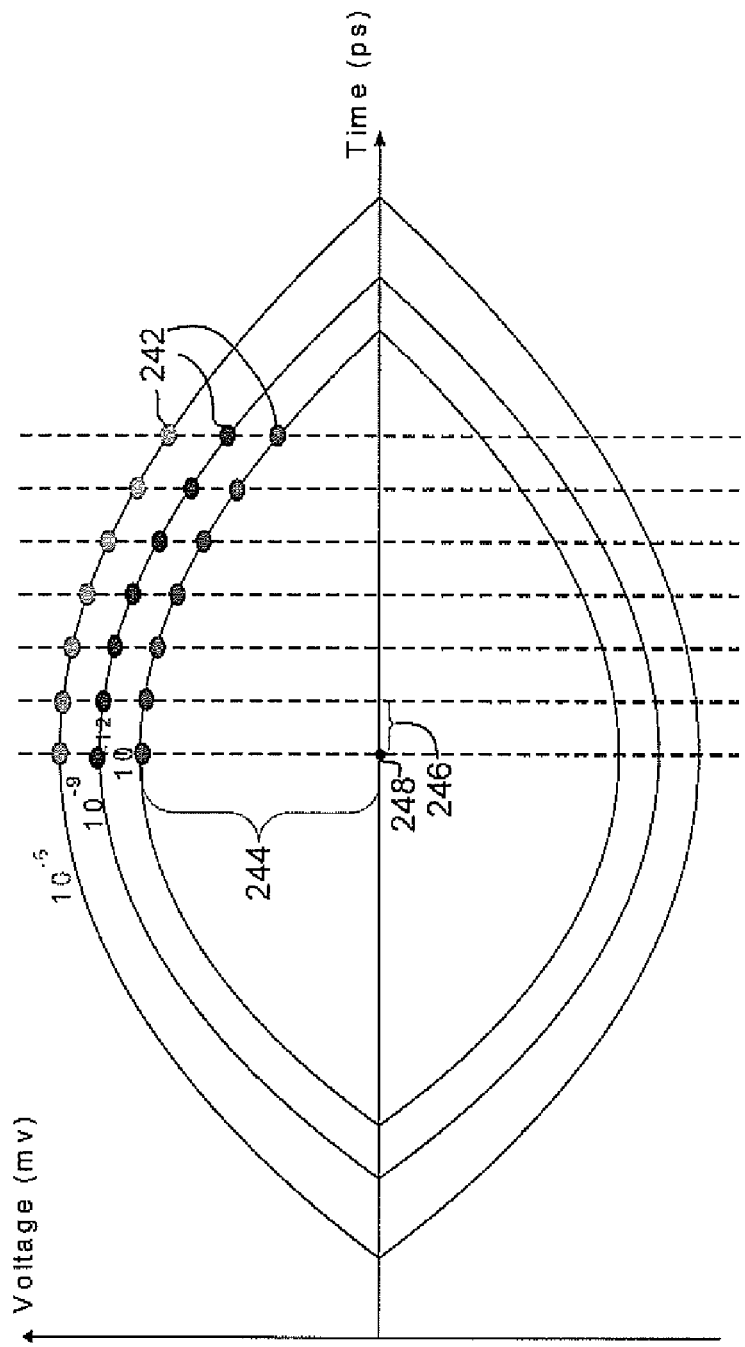
FIG. 7 is a sample statistical eye diagram plot generated via the eye monitoring system of FIG. 1.

In step 218, the statistical eye diagram is plotted and shown via a graphical user interface (GUI), such as that shown in FIGS. 4, 5. In FIG. 4, a completed eye plot is shown. In FIG. 5, a partial eye plot is shown, due to the data collection across the interface 24 from the measurement control module 22, 22' being in an interrupted state. Vertical and horizontal margins for the different BER points 230 can be obtained directly from the plots. Each BER point 230 represents a probability that a signal passes through that point or is outside that point in the statistical eye diagram. A statistical eye diagram is used to indicate eye characteristics with probability measurements. The statistical eye diagram may be used, especially in high-speed communication applications, as a tool to evaluate the performance of a receiver. See e.g. PCIe and IEEE 802.3ap. Examples of a signal eye diagram are shown in FIGS. 6, 7. Each curve of FIG. 6 represents an equal probability level inside which an analog waveform can be observed with that probability. For example, to check the eye margins at a BER of $10^{-12}$, the curve 240 having a BER delineation 12 is used. FIG. 7 illustrates BER points 242 associated with particular amplitude margins 244 and phase offsets 246, which are measured from an eye center point 248. The center point 248 is commonly associated with or is the same as the zero-crossing point.

Referring to FIGS. 4, 5, the GUI may have various input controls, tabs, buttons, etc. to control the operation of the control modules 22, 40. The inputs may include a get eye measurement data button 250, a load eye measurement data from fife button 252, a save eye data to file button 254, a plot button 256, and a clear plot button 258. The GUI may also include a smart name selector 260 and a smart plot selector 262, which may refer to quick data collection or plotting through the gathering of a selected number of BER points or samples per point. An interrupt button 264 is provided to pause data collection, processing and plotting. A BER key 266 is also provided. The stated buttons and selectors may have associated software modules for performance of the functions associated therewith.

Jitter margins can be obtained by the examination of a horizontal sections histogram, which may relate amplitude, phase or BER versus one unit interval (UI). Jitter is measured near the zero-crossing point by setting the error comparator threshold signal $EM_{Th}$ to zero and the sampling phase signal $S_{ph}$ to selected values. The jitter measurement result for each sampling phase is saved and may be plotted. A designated counter or register for jitter may be incorporated in the measurement control module 22.

Inter-symbol interference (ISI) jitter may be determined by measuring the jitter value with ISI eliminated using a fixed transmitter data pattern at or near a zero-crossing point. ISI may be eliminated by looping back the trace or recovered data signal b̂ and by using a signal clock to drive the transmitter and the receiver. The measured jitter value is subtracted from a measured jitter value using a random data pattern near the same zero-crossing point.

Duty cycle distortion (DCD) jitter may be determined by transmitting the data pattern [1,0,1,0 . . . ] and measuring the jitter around two zero-crossing points for a half rate receiver. The difference between the two sampling phases is the DCD jitter.

Clock/phase-locked loop (PLL) jitter and noise contributed jitter may be determined also by sending the data pattern [1,0,1,0 . . . ] and measuring the jitter near a zero-crossing point.

Noise may be measured at a data sampling phase with a fixed data pattern, such as [1,0,1,0 . . . ]. The waveform is nearly flat at the data sampling phase, thus the jitter contribution to the amplitude histogram spread is minimum. Also the fixed data pattern eliminates the ISI contribution to the amplitude variation. The histogram measured represents the circuit noise effect.

The above described eye monitor system and method do not require any additional test/measurement setup for acquiring, detecting, measuring, and evaluating statistical eye information. Eye statistics are provided at any sampling phase and eye height or amplitude margin. Although the phase is shown in seconds and the amplitude is shown in voltage, other phase and amplitude representative delineations may be used. The statistical eye measurement can be obtained in real time as the receiver is operating in its normal condition. The described measurement process does not interfere with the functioning of the receiver. As such, the statistics obtained thus reflect the true margin of the communication system in its normal operating condition. Furthermore, since the eye data is collected within the receiver a true eye diagram is obtained.

The above-described steps are meant to be illustrative examples; the steps may be performed sequentially, synchronously, simultaneously, or in a different order depending upon the application.

Referring now to FIGS. 8A-8G, various exemplary implementations incorporating the teachings of the present disclosure are shown. The teachings of the disclosure can be implemented in serial interfaces and links between various communication devices.

Figure 8A:
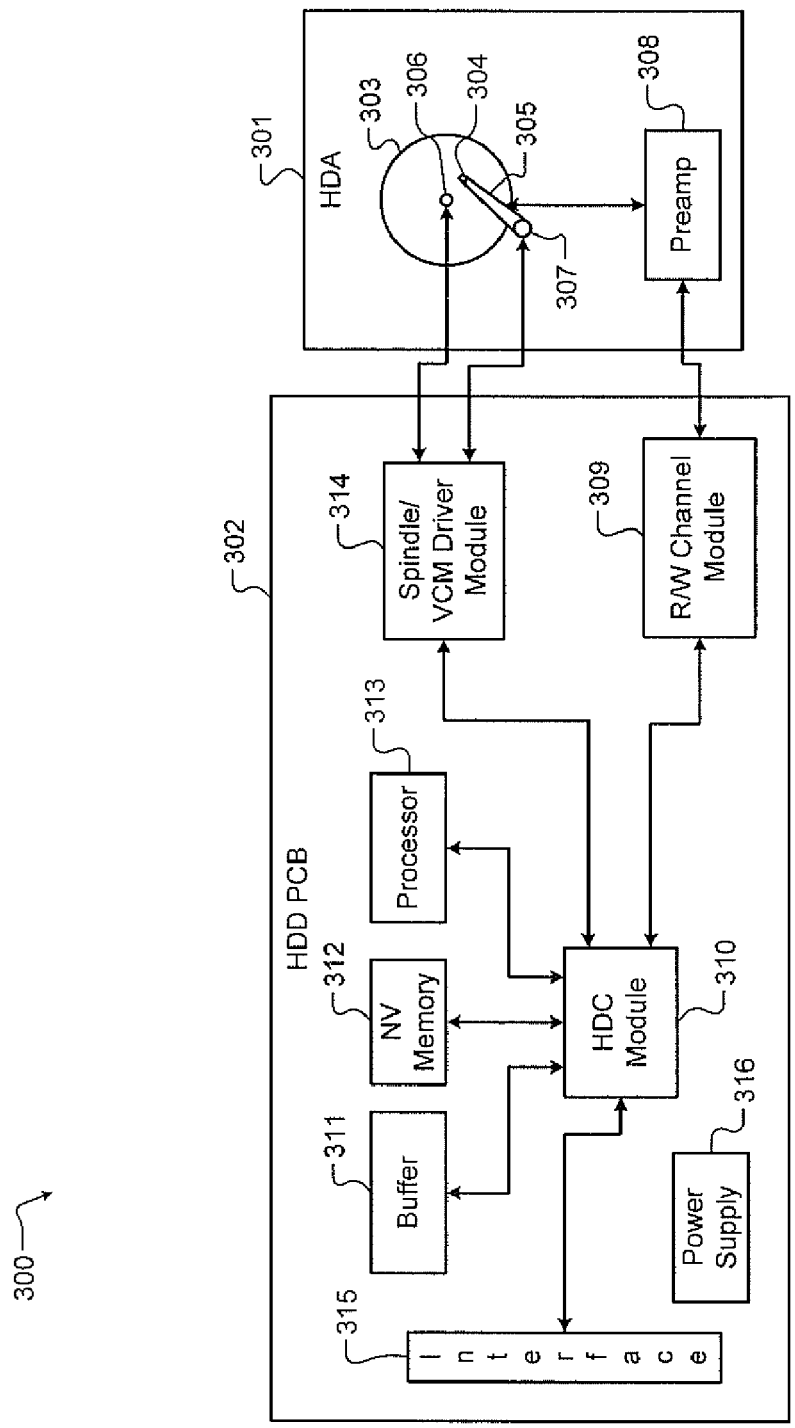
FIG. 8A is a functional block diagram of a hard disk drive.

Referring now to FIG. 8A, the teachings of the disclosure can be implemented in an I/O interface 315 of a hard disk drive (HDD) 300. The I/O interface 315 may have an EM module, such as the above-described EM module 20. The HDD 300 includes a hard disk assembly (HDA) 301 and an HDD printed circuit board (PCB) 302. The HDA 301 may include a magnetic medium 303, such as one or more platters that store data, and a read/write device 304. The read/write device 304 may be arranged on an actuator arm 305 and may read and write data on the Magnetic medium 303. Additionally, the HDA 301 includes a spindle motor 306 that rotates the magnetic medium 303 and a voice-coil motor (VCM) 307 that actuates the actuator arm 305. A preamplifier device 308 amplifies signals generated by the read/write device 304 during read operations and provides signals to the read/write device 304 during write operations.

The HDD PCB 302 includes a read/write channel module (hereinafter, "read channel") 309, a hard disk controller (HDC) module 310, a buffer 311, nonvolatile memory 312, a processor 313, and a spindle/VCM driver module 314. The read channel 309 processes data received from and transmitted to the preamplifier device 308. The HDC module 310 controls components of the HDA 301 and communicates with an external device (not shown) via the I/O interface 315. The external device may include a computer, a multimedia device, a mobile computing device, etc. The I/O interface 315 may include wireline and/or wireless communication links.

The HDC module 310 may receive data from the HDA 301, the read channel 309, the buffer 311, nonvolatile memory 312, the processor 313, the spindle/VCM driver module 314, and/or the I/O interface 315. The processor 313 may process the data, including encoding, decoding, filtering, and/or formatting. The processed data may be output to the HDA 301, the read channel 309, the buffer 311, nonvolatile memory 312, the processor 313, the spindle/VCM driver module 314, and/or the I/O interface 315.

The HDC module 310 may use the buffer 311 and/or nonvolatile memory 312 to store data related to the control and operation of the HDD 300. The buffer 311 may include DRAM, SDRAM, etc. The nonvolatile memory 312 may include flash memory (including NAND and NOR flash memory), phase change memory, magnetic RAM, or multi-state memory, in which each memory cell has more than two states. The spindle/VCM driver module 314 controls the spindle motor 306 and the VCM 307. The HDD PCB 302 includes a power supply 316 that provides power to the components of the HDD 300.

Figure 8B:
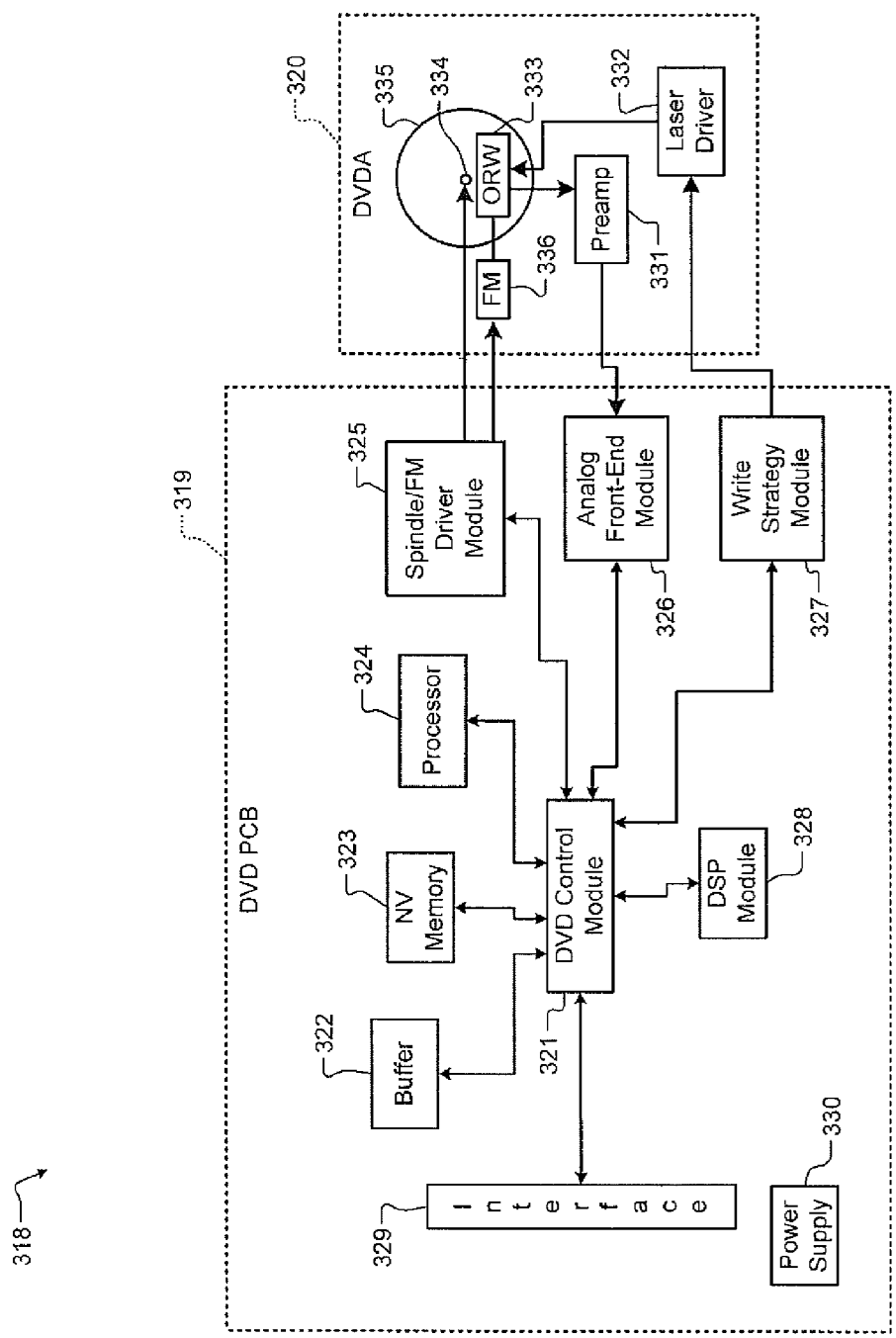
FIG. 8B is a functional block diagram of a DVD drive.

Referring now to FIG. 8B, the teachings of the disclosure can be implemented in an I/O interface 329 of a DVD drive 318 or of a CD drive (not shown). The I/O interface 329 may have an EM module, such as the above-described EM module 20. The DVD drive 318 includes a DVD PCB 319 and a DVD assembly (DVDA) 320. The DVD PCB 319 includes a DVD control module 321, a buffer 322, nonvolatile memory 323, a processor 324, a spindle/FM (feed motor) driver module 325, an analog front-end module 326, a write strategy module 327, and a DSP module 328.

The DVD control module 321 controls components of the DVDA 320 and communicates with an external device (not shown) via an I/O interface 329. The external device may include a computer, a multimedia device, a mobile computing device, etc. The I/O interface 329 may include wireline and/or wireless communication links.

The DVD control module 321 may receive data from the buffer 322, nonvolatile memory 323, the processor 324, the spindle/FM driver module 325, the analog front-end module 326, the write strategy module 327, the DSP module 328, and/or the I/O interface 329. The processor 324 may process the data, including encoding, decoding, filtering, and/or formatting. The DSP module 328 performs signal processing, such as video and/or audio coding/decoding. The processed data may be output to the buffer 322, nonvolatile memory 323, the processor 324, the spindle/FM driver module 325, the analog front-end module 326, the write strategy module 327, the DSP module 328, and/or the I/O interface 329.

The DVD control module 321 may use the buffer 322 and/or nonvolatile memory 323 to store data related to the control and operation of the DVD drive 318. The buffer 322 may include DRAM, SDRAM, etc. The nonvolatile memory 323 may include flash memory (including NAND and NOR flash memory), phase change memory, magnetic RAM, or multi-state memory, in which each memory cell has more than two states. The DVD PCB 319 includes a power supply 330 that provides power to the components of the DVD drive 318.

The DVDA 320 may include a preamplifier device 331, a laser driver 332, and an optical device 333, which may be an optical read/write (ORW) device or an optical read-only (OR) device. A spindle motor 334 rotates an optical storage medium 335, and a feed motor 336 actuates the optical device 333 relative to the optical storage medium 335.

When reading data from the optical storage medium 335, the laser driver provides a read power to the optical device 333. The optical device 333 detects data from the optical storage medium 335, and transmits the data to the preamplifier device 331. The analog front-end module 326 receives data from the preamplifier device 331 and performs such functions as filtering and A/D conversion. To write to the optical storage medium 335, the write strategy module 327 transmits power level and timing data to the laser driver 332. The laser driver 332 controls the optical device 333 to write data to the optical storage medium 335.

Figure 8D:
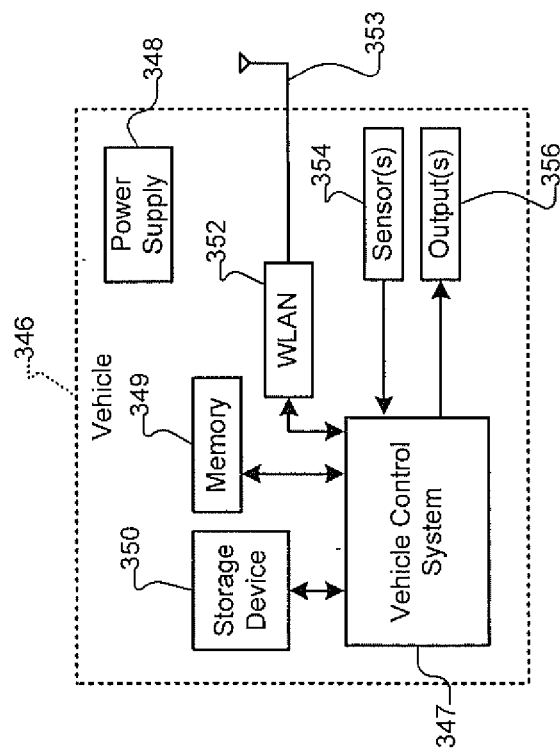
FIG. 8D is a functional block diagram of a vehicle control system.
Figure 8C:
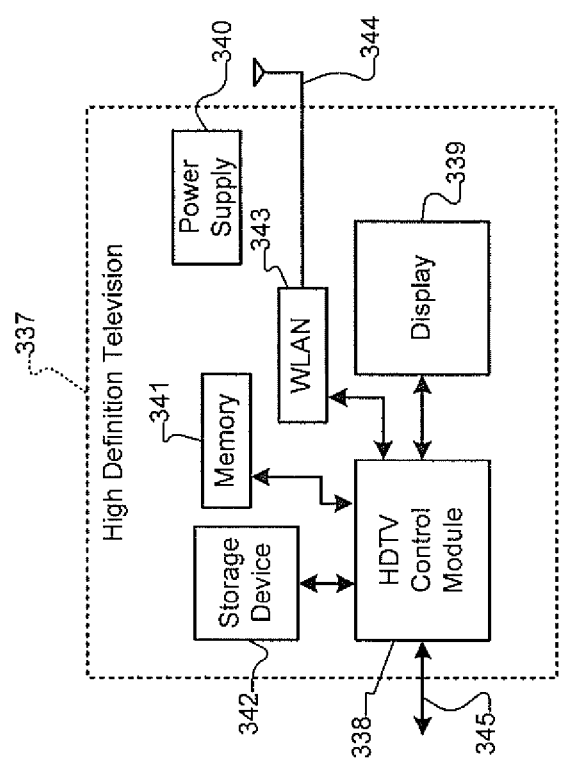
FIG. 8C is a functional block diagram of a high definition television.

Referring now to FIG. 8C, the teachings of the disclosure can be implemented in a wireless local area network (WLAN) interface 343 of a high definition television (HDTV) 337 for receiver signal recovery performance evaluation. Signals received by the antenna 344, which are recovered, may be evaluated. The WLAN may have an EM module, such as the above-described EM module 20. The HDTV 337 includes a HDTV control module 338, a display 339, a power supply 340, memory 341, a storage device 342, the WLAN interface 343 and associated antenna 344, and an external interface 345.

The HDTV 337 can receive input signals from the WLAN interface 343 and/or the external interface 345, which sends and receives information via cable, broadband Internet, and/or satellite. The HDTV control module 338 may process the input signals, including encoding, decoding, filtering, and/or formatting, and generate output signals. The output signals may be communicated to one or more of the display 339, memory 341, the storage device 342, the WLAN interface 343, and the external interface 345.

Memory 341 may include random access memory (RAM) and/or nonvolatile memory such as flash memory, phase change memory, or multi-state memory, in which each memory cell has more than two states. The storage device 342 may include an optical storage drive, such as a DVD drive, and/or a hard disk drive (HDD). The HDTV control module 338 communicates externally via the WLAN interface 343 and/or the external interface 345. The power supply 340 provides power to the components of the HDTV 337.

Referring now to FIG. 8D, the teachings of the disclosure may be implemented in a WLAN interface 353 of a vehicle 346 for receiver signal recovery performance evaluation. Signals received by the antenna 353 which are recovered may be evaluated. The WLAN may have an EM module, such as the above-described EM module 20. The vehicle 346 may include a vehicle control system 347, a power supply 348, memory 349, a storage device 350, and the WLAN interface 352 and associated antenna 353. The vehicle control system 347 may be a powertrain control system, a body control system, an entertainment control system, an anti-lock braking system (ABS), a navigation system, a telematics system, a lane departure system, an adaptive cruise control system, etc.

The vehicle control system 347 may communicate with one or more sensors 354 and generate one or more output signals 356. The sensors 354 may include temperature sensors, acceleration sensors, pressure sensors, rotational sensors, airflow sensors, etc. The output signals 356 may control engine operating parameters, transmission operating parameters, suspension parameters, etc.

The power supply 348 provides power to the components of the vehicle 346. The vehicle control system 347 may store data in memory 349 and/or the storage device 350. Memory 349 may include random access memory (RAM) and/or nonvolatile memory such as flash memory, phase change memory, or multi-state memory, in which each memory cell has more than two states. The storage device 350 may include an optical storage drive, such as a DVD drive, and/or a hard disk drive (HDD). The vehicle control system 347 may communicate externally using the WLAN interface 352.

Figure 8F:
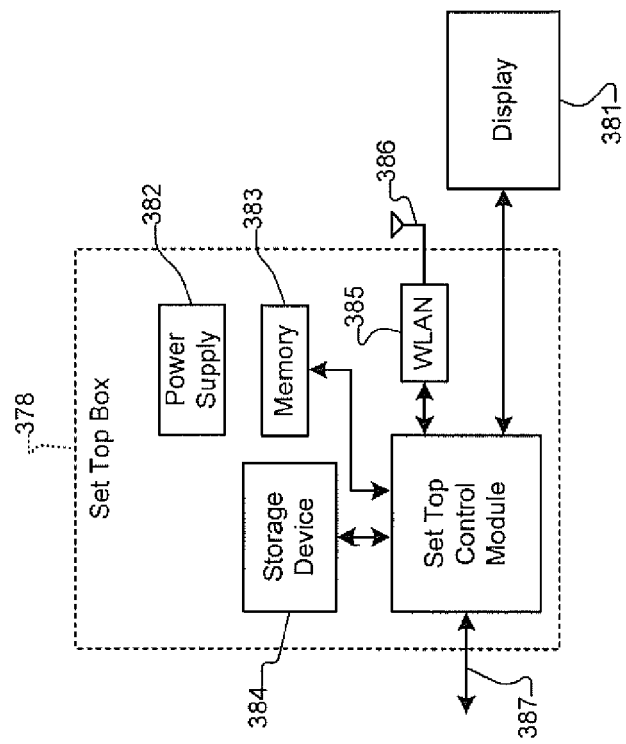
FIG. 8F is a functional block diagram of a set top box.
Figure 8E:
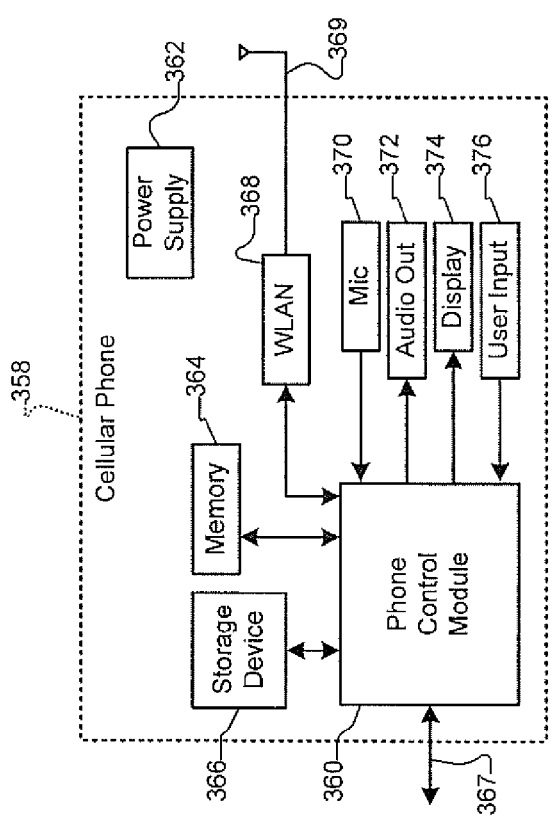
FIG. 8E is a functional block diagram of a cellular phone.

Referring now to FIG. 8E, the teachings of the disclosure can be implemented in a WLAN interface 368 of a cellular phone 358 for receiver signal recovery performance evaluation. Signals received by the antenna 369, which are recovered, may be evaluated. The WLAN may have an EM module, such as the above-described EM module 20. The cellular phone 358 includes a phone control module 360, a power supply 362, memory 364, a storage device 366, and a cellular network interface 367. The cellular phone 358 may include the WLAN interface 368 and associated antenna 369, a microphone 370, an audio output 372 such as a speaker and/or output jack, a display 374, and a user input device 376 such as a keypad and/or pointing device.

The phone control module 360 may receive input signals from the cellular network interface 367, the WLAN interface 368, the microphone 370, and/or the user input device 376. The phone control module 360 may process signals, including encoding, decoding, filtering, and/or formatting, and generate output signals. The output signals may be communicated to one or more of memory 364, the storage device 366, the cellular network interface 367, the WLAN interface 368, and the audio output 372.

Memory 364 may include random access memory (RAM) and/or nonvolatile memory such as flash memory, phase change memory, or multi-state memory, in which each memory cell has more than two states. The storage device 366 may include an optical storage drive, such as a DVD drive, and/or a hard disk drive (HDD). The power supply 362 provides power to the components of the cellular phone 358.

Referring now to FIG. 8F, the teachings of the disclosure can be implemented in a WLAN interface 385 of a set top box 378 for receiver signal recovery performance evaluation. Signals received by the antenna 386, which are recovered, may be evaluated. The WLAN may have an EM module, such as the above-described EM module 20. The set top box 378 includes a set top control module 380, a display 381, a power supply 382, memory 383, a storage device 384, and the WLAN interface 385 and associated antenna 386.

The set top control module 380 may receive input signals from the WLAN interface 385 and an external interface 387, which can send and receive information via cable, broadband Internet, and/or satellite. The set top control module 380 may process signals, including encoding, decoding, filtering, and/or formatting, and generate output signals. The output signals may include audio and/or video signals in standard and/or high definition formats. The output signals may be communicated to the WLAN interface 385 and/or to the display 381. The display 381 may include a television, a projector, and/or a monitor.

The power supply 382 provides power to the components of the set top box 378. Memory 383 may include random access memory (RAM) and/or nonvolatile memory such as flash memory, phase change memory, or multi-state memory, in which each memory cell has more than two states. The storage device 384 may include an optical storage drive, such as a DVD drive, and/or a hard disk drive (HDD).

Figure 8G:
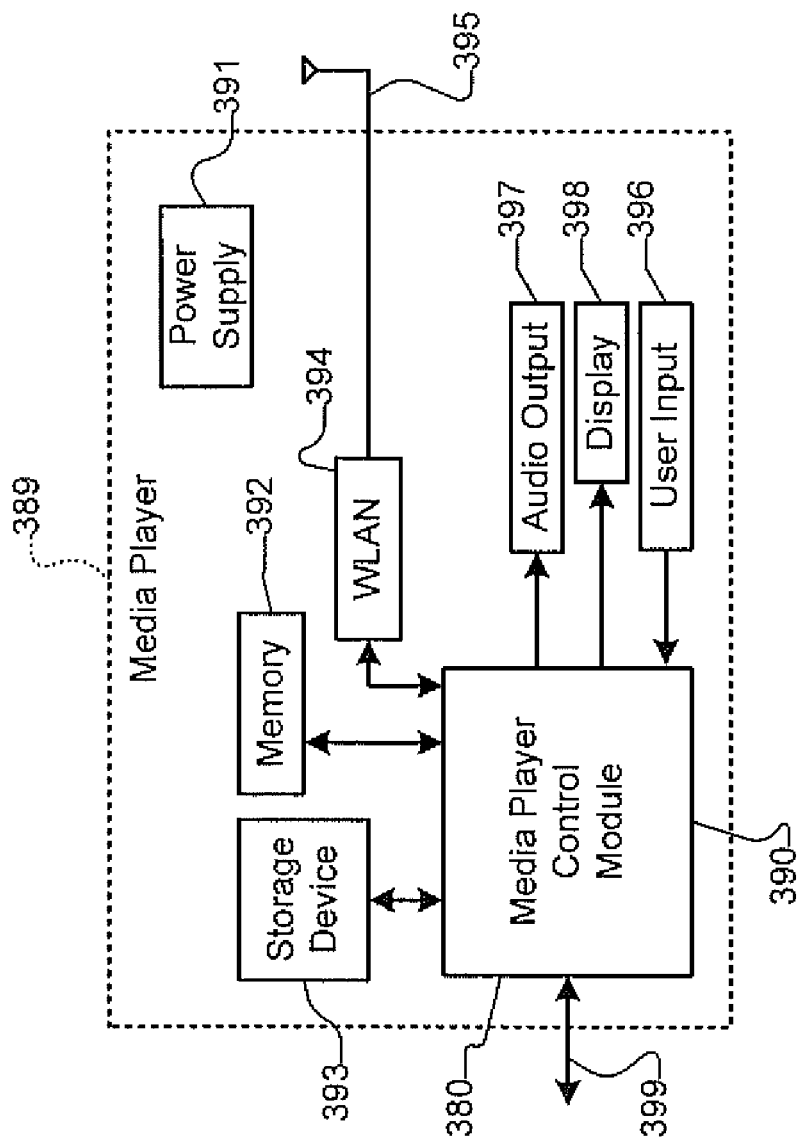
FIG. 8G is a functional block diagram of a media player.

Referring now to FIG. 8G, the teachings of the disclosure can be implemented in a WLAN interface 394 of a media player 389 for receiver signal recovery performance evaluation. Signals received by the antenna 395, which are recovered, may be evaluated. The WLAN may have an EM module, such as the above-described EM module 20. The media player 389 may include a media player control module 390, a power supply 391, memory 392, a storage device 393, the WLAN interface 394 and associated antenna 395, and an external interface 399.

The media player control module 390 may receive input signals from the WLAN interface 394 and/or the external interface 399. The external interface 399 may include USB, infrared, and/or Ethernet. The input signals may include compressed audio and/or video, and may be compliant with the MP3 format. Additionally, the media player control module 390 may receive input from a user input 396 such as a keypad, touchpad, or individual buttons. The media player control module 390 may process input signals, including encoding, decoding, filtering, and/or formatting, and generate output signals.

The media player control module 390 may output audio signals to an audio output 397 and video signals to a display 398. The audio output 397 may include a speaker and/or an output jack. The display 398 may present a graphical user interface, which may include menus, icons, etc. The power supply 391 provides power to the components of the media player 389. Memory 392 may include random access memory (RAM) and/or nonvolatile memory such as flash memory, phase change memory, or multi-state memory, in which each memory cell has more than two states. The storage device 393 may include an optical storage drive, such as a DVD drive, and/or a hard disk drive (HDD).

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
a summer configured to (i) receive a data input signal, and (ii) generate an equalized signal in response to the data input signal;
a comparator configured to generate a recovered data signal in response to the equalized signal;
a zero-crossing module configured to generate a zero-crossing signal in response to the equalized signal, wherein the zero-crossing signal indicates when the equalized signal crosses a zero-crossing threshold; and
a control module configured to generate eye information in response to (i) the recovered data signal and (ii) the zero-crossing signal, wherein the eye information includes characteristic data associated with the recovered data signal, and wherein the characteristic data when plotted provides an eye diagram.

2. The system of claim 1, wherein the summer is configured to (i) receive a feedback signal, and (ii) generate the equalized signal in response to the feedback signal.

3. The system of claim 2, wherein the feedback signal is generated in response to the recovered data signal.

4. The system of claim 3, further comprising a filter configured to generate the feedback signal in response to the recovered data signal.

5. The system of claim 4, wherein:
the control module is configured to generate a control signal in response to the recovered data signal; and
the filter is configured to generate the feedback signal in response to the control signal.

6. The system of claim 1, wherein:
the comparator is configured to generate the recovered data signal in response to a threshold signal; and
the control module is configured to generate the threshold signal (i) in response to the recovered data signal, and (ii) to minimize errors in the recovered data signal.

7. The system of claim 1, wherein the zero-crossing module is configured to generate the zero-crossing signal in response to (i) a threshold signal, and (ii) a phase signal.

8. The system of claim 7, wherein:
in response to the recovered data signal, the control module is configured to generate (i) the threshold signal, and (ii) a timing signal; and
the system further comprises a phase interpolator configured to generate the phase signal in response to the timing signal.

9. The system of claim 8, wherein:
the phase interpolator is configured to generate a second phase signal in response to the timing signal; and
the comparator is configured to generate the recovered data signal in response to the second phase signal.

10. The system of claim 1, wherein the eye information comprises bit error information, valid bit information, phase offset information or amplitude offset information.

11. The system of claim 1, further comprising an error module configured to generate an error signal in response to the equalized signal,
wherein the control module is configured to generate the eye information in response to the error signal.

12. The system of claim 11, wherein:
the control module is configured to generate a threshold signal in response to the recovered data signal; and
the error module is configured to generate the error signal in response to the threshold signal.

13. The system of claim 12, wherein:
the error module is configured to receive the equalized signal and the threshold signal; and
the control module is configured to generate the threshold signal in response to the error signal.

14. The system of claim 12, wherein:
the control module is configured to generate a timing signal;
the error module comprises a phase interpolator configured to generate a phase offset in response to the timing signal; and
the error module is configured to generate the error signal in response to the phase offset.

15. The system of claim 1, wherein:
the control module is configured to generate a feedback control signal in response to the recovered data signal; and
the system further comprises a feedforward equalizer configured to generate the data input signal in response to the feedback control signal.

16. The system of claim 1, wherein:
the control module is configured to, in response to an offset signal, generate (i) a first timing signal, and (ii) a second timing signal;
the system further comprises
a first phase interpolator configured to generate a phase offset in response to the first timing signal,
an error module configured to generate an error signal in response to (i) the equalized signal, and (ii) the phase offset, and
a second phase interpolator configured to generate a phase signal in response to the second timing signal;
the control module is configured to generate the eye information in response to the error signal; and
the zero-crossing module is configured to generate the zero-crossing signal in response to the phase signal.

17. The system of claim 16, wherein the control module is configured to maintain a difference between the first timing signal and the second timing signal at a predetermined value.

18. The system of claim 1, further comprising:
an interface configured to receive the eye information from the control module; and
an evaluation module (i) separate from the control module, (ii) connected to the interface, (iii) configured to generate the eye diagram based on the eye information, and (iv) configured to display the diagram on a display.

19. The system of claim 18, wherein:
the interface includes a universal asynchronous transceiver; and
the evaluation module includes a graphical user interface.

20. The system of claim 19, wherein:
the eye diagram includes bit error rates for a plurality of points, wherein the plurality of points are generated based on the characteristic data; and
each of the plurality of points has an associated amplitude offset and phase offset.

* * * * *